United States Patent [19]
Poon et al.

[11] 3,955,660
[45] May 11, 1976

[54] CLUTCH WITH FLEXIBLE COUPLING BETWEEN RELEASE BEARING AND LEVERS

[75] Inventors: Sui Yun Poon, Chelmsford; George Albert Tune, Pontefract, both of England

[73] Assignee: Ransome Hoffmann Pollard Limited, England

[22] Filed: May 31, 1974

[21] Appl. No.: 475,106

[30] Foreign Application Priority Data
June 1, 1973 United Kingdom............... 26177/73

[52] U.S. Cl............................... 192/91 A; 92/109; 92/168
[51] Int. Cl.²......................................... F16D 25/08
[58] Field of Search............... 192/91 A, 85 CA, 98; 91/107, 108, 109

[56] References Cited
UNITED STATES PATENTS

| | | | |
|---|---|---|---|
| 2,135,617 | 11/1938 | Geyer............................ | 192/91 A X |
| 3,079,896 | 3/1963 | Johnston........................... | 92/108 X |
| 3,559,540 | 2/1971 | Sheldon............................. | 92/168 X |
| 3,672,478 | 6/1972 | Riese et al......................... | 192/91 A |

FOREIGN PATENTS OR APPLICATIONS

| | | | |
|---|---|---|---|
| 944,090 | 12/1963 | United Kingdom............... | 192/91 A |
| 703,053 | 2/1965 | Canada................................. | 92/168 |

*Primary Examiner*—Benjamin W. Wyche
*Attorney, Agent, or Firm*—Brisebois & Kruger

[57] ABSTRACT

A clutch release bearing and actuating mechanism, for a motor vehicle, comprises a clutch-disengaging device which is actuable, via a rolling-element thrust bearing, by a hydraulically actuated device. The hydraulically actuated device comprises a pair of stepped cylindrical members which define an annular chamber therebetween. The outer cylindrical member is slidable over the inner cylindrical member. The inner cylindrical member is fast to a housing member and the annular chamber is connectible to a supply of hydraulic fluid. The inner ring of the thrust bearing is fast to the outer cylindrical member and the outer ring of the bearing is flexibly coupled to the clutch-disengaging device.

7 Claims, 2 Drawing Figures

CLUTCH WITH FLEXIBLE COUPLING BETWEEN RELEASE BEARING AND LEVERS

This invention relates to a clutch mechanism and in particular to a clutch release bearing and actuating mechanism for a motor vehicle.

The primary requirement of a clutch mechanism, from the operator's point of view, is that of correct "feel," that is to say that clutch engagement should be smooth and gradual and the effort required to control the clutch pedal should not be excessive. The feel of a clutch can be defined by the expression "maximum pedal effort × pedal travel."

Clutches are usually operated through mechanical linkages and of late direct hydraulically operated units are being proposed. Where a clutch is operated through mechanical linkages, wear of the clutch affects the pedal travel necessary for its operation and so affects the feel of such a clutch. Moreover, it is necessary to adjust the clutch to compensate for clutch wear. A direct hydraulically operated clutch of the type having an annular piston-cylinder combination offers the advantage that clutch wear is automatically compensated by the change in the fluid volume in the cylinder. Furthermore, a mechanical linkage has to be adapted to suit the available space and the layout of each type of vehicle whereas a direct hydraulically operated system forms an integral part of the clutch unit and only a hydraulic connection is required between the clutch unit and the clutch pedal. Thus hydraulically operated units are more flexible to install than those utilising a mechanical linkage.

Clutches are designed to be operated by either a "push" or a "pull" action from their operating mechanisms. Generally speaking light motor vehicles such as motor cars are of the push variety whereas heavier vehicles are of the pull type. This is because light vehicle clutches have a single clutch pressure plate which is operable by a push mechanism, whereas heavy vehicles clutches have a plurality of frictional discs and when used in conjunction with clutch brakes, they are arranged to have pull type release mechanism.

One proposed pull type hydraulic clutch release mechanism for heavy motor vehicles has an annular piston-cylinder combination which acts on the outer ring of the normal rolling-element thrust bearing. The inner ring of this bearing is fast to a cylindrical member journalled on the transmission input shaft. Thus, movement of the movable member of the piston-cylinder combination can be transmitted to the clutch release lever by a pull action via the bearing and this cylindrical member. The disadvantage of this proposed arrangement is that, as the annular piston-cylinder combination surrounds the thrust bearing, its seal has a large circumference which results in high frictional resistance and, therefore, increased pedal effort which may offset any advantage obtained by pedal travel reduction afforded by the automatic compensation of the hydraulic arrangement. In some cases it has been estimated that pedal effort may be increased by as much as 30–40% which would make the mechanism totally unattractive commercially. Moreover, because of the large surface area swept by the seal, special precautions would have to be taken if the seal were to achieve an acceptable leakage rate and service life.

Another important disadvantage of such a pull type hydraulic clutch release mechanism is that its sealing efficiency is adversely affected by vibrations. The two most likely sources of vibration arise from misalignment between the axes of the annular piston-cylinder combination and the transmission input shaft and from misalignment between the axes of the clutch pressure plate and the thrust bearing.

There are three ways in which a pair of axes can be misaligned. They can point in different directions (that is to say be non-parallel, but meet at a point), they can be parallel but displaced from one another (that is to say they do not meet at a point), or they can be both non-parallel and also point in different directions (a combination of the first two misalignments). Thus, there are six possible sources of misalignment in a pull-type clutch, three from the axes of the annular piston-cylinder combination and the transmission input shaft and three from the axes of the clutch pressure plate and the thrust bearing. Any one of these possible misalignments causes not only vibrations which affect the sealing efficiency of the hydraulic part of the clutch, but also fretting at the contacting surfaces such as the pivot points of the clutch release levers. This fretting leads to wear and premature failure of the clutch.

The present invention provides a clutch release bearing and actuating mechanism, for a motor vehicle, comprising a clutch-disengaging device which is actuable, via a rolling-element thrust bearing, by a hydraulically actuated device, the hydraulically actuated device comprising a pair of stepped cylindrical members which form an annular chamber therebetween, the outer cylindrical member being slidable over the inner cylindrical member which is fast to a housing member and the annular chamber being connectible to a source of hydraulic fluid, wherein the inner ring of the bearing is fast to the outer cylindrical member and the outer ring of the bearing is flexibly coupled to the clutch-disengaging device.

As the inner cylindrical member is fast to the housing of the clutch any vibration, fretting and wear arising from misalignment of the axes of the annular chamber and the transmission input shaft is prevented. Moreover, the flexible coupling between the outer ring of the bearing and the clutch-disengaging device permits any vibration, fretting and wear arising owing to misalignment between the axes of clutch pressure plate and the bearing to be accommodated elastically.

The outer cylindrical member may be movable away from the clutch-disengaging device to disengage the clutch by a pull action. Thus, this clutch release bearing and actuating mechanism can be used for heavy motor vehicles.

Advantageously, the inner cylindrical member comprises a first, inner tubular member fast to the housing member and a second, outer tubular member fast to the first tubular member, the second tubular member being shorter than the first tubular member so as to define the step of the inner cylindrical member and the outer cylindrical member being slidable on the second tubular member, the second tubular member being made of a material having a low coefficient of friction.

Preferably, the stepped portion of the outer cylindrical member is slidably supported on the first tubular member by means of an L-shaped support ring made of a material having a low coefficient of friction.

Each end of the annular chamber may be provided with a sealing member.

Owing to the arrangement of the bearing around the hydraulically actuated device, the annular chamber (cylinder) of the piston-cylinder combination is considerably smaller than in known constructions. Thus, not only is the clutch size itself reduced, but also the sealing members in the annular chamber can be small and simple and so there is little frictional resistance to the sliding movement between the stepped cylinders and so the pedal effort required to operate a clutch incorporating this arrangement is considerably less than for known hydraulic units for heavy motor vehicles. Consequently, the feel of such a clutch is an improvement on known clutches.

Preferably, the annular chamber is connectible to the source of hydraulic fluid via a passage in the outer cylindrical member.

Advantageously, a spring steel plate provides the flexible coupling between the outer ring of the bearing and the clutch-disengaging device.

A clutch mechanism incorporating a clutch release bearing and actuating mechanism in accordance with the invention will now be described, by way of example, with reference to the accompanying drawings, in which.

Figure 1:
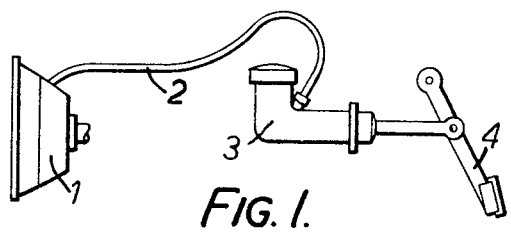
FIG. 1 is a diagrammatic view of a complete clutch assembly.

Referring to the drawings, FIG. 1 shows a clutch housing member 1, a hydraulic fluid pipe 2 and a clutch master cylinder unit 3 which is operable to actuate the clutch mechanism by a conventional foot pedal 4.

Figure 2:
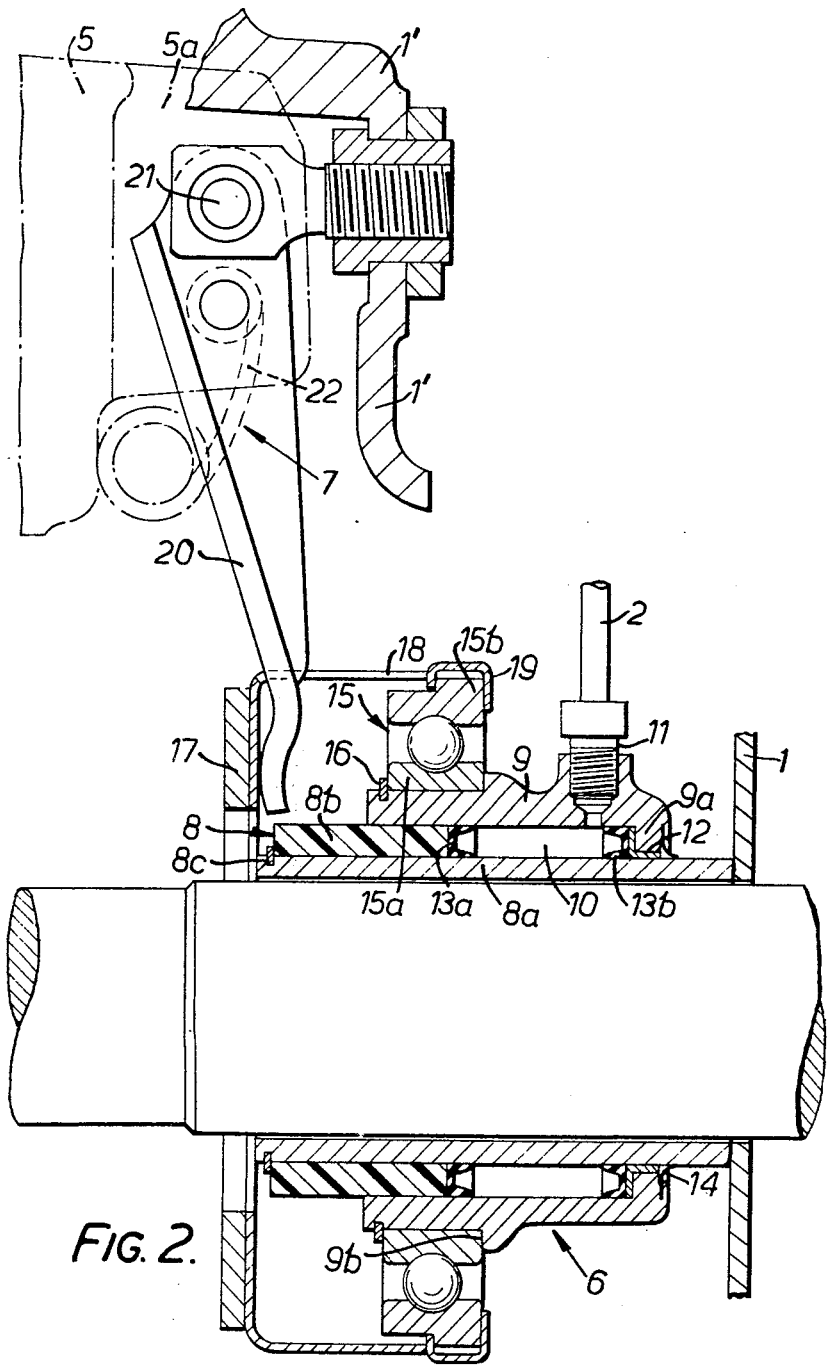
FIG. 2 is an enlarged, part sectional elevation of part of FIG. 1.

FIG. 2 shows the structure within the stationary clutch housing member 1. A clutch pressure plate 5 is arranged to be disengaged by a pull action by means of the hydraulic actuating mechanism, indicated generally by the reference numeral 6, via an intermediate linkage, indicated generally by the reference numeral 7. When the clutch is engaged, frictional discs (not shown) are clamped between the flywheel (not shown) and the pressure plate 5 by springs (not shown) retained in a precompressed state between the pressure plate and a cover pressing 1' integral with the flywheel.

The hydraulic actuating mechanism comprises a pair of stepped cylinders 8 and 9 which define a chamber 10. Hydraulic fluid can enter the chamber 10 from the fluid pipe 2 via an inlet port 11 in the cylinder 9. The inner cylinder 8 comprises an inner cylindrical member 8a which is fastened to the housing 1 and a shorter outer cylindrical member 8b which is held against the member 8a by means of a circlip 8c, the outer cylinder 9 and the pressure of hydraulic fluid in the chamber 10. The outer cylinder 9 and the member 8a are made of high grade cast iron and the member 8b is made of nylon. Alternatively the members 9 and 8a could be made of either steel or aluminium which have been subjected to anti-corrosion surface treatment, and the member 8b could be made of any other polymeric material having a low coefficient of friction. The inner cylinder 8 thus forms the stationary part of a piston-cylinder combination, the outer cylinder 9 being axially movable along the member 8b. It is to assist this movement that the member 8b is made of a material having a low coefficient of friction. A support ring 12, engaging the member 8a, is provided as a slight interference fit within the stepped portion 9a of the outer cylinder 9. This support ring 12 is also made of polymeric material having a low coefficient of friction (such as nylon) so as to assist the axial movement of the cylinder 9. On the ends of the chamber 10 sealing members 13a and 13b are provided. The movable cylinder 9 is also provided with a flexible wiper member 14 which resiliently engages the member 8a so as to keep its surface clean by a wiping action as the cylinder 9 moves relative to cylinder 8. Alternatively, a single composite unit can carry out the functions of the support ring 12, the sealing member 13b and the wiper member 14.

A thrust bearing 15, having an inner ring 15a and an outer ring 15b, is mounted on the outer cylinder 9. The inner ring 15a is held between a shoulder 9b, formed on the external surface of the cylinder 9, and a circlip 16. The outer ring 15b is connected to an annular ring 17 by means of an L-shaped flexible spring steel member 18. The member 18 is bonded to the ring 17 and held against the outer ring 15b by means of a clip 19.

The intermediate linkage 7 comprises several clutch release levers 20 (only one of which is shown in FIG. 2) one end of each lever being fixed at 21 to an extension 5a of the clutch pressure plate 5, and other end of each lever engaging that portion of the spring steel member 18 which is backed by the ring 17. The extension 5a and therefore the clutch pressure plate 5, is biassed to the left as seen in FIG. 2, that is to say in a direction resulting in engagement of the clutch by means of the springs retained in a precompressed state between the clutch pressure plate and the cover pressing 1'.

To disengage the clutch and drive, the foot pedal 4 (see FIG. 1) is depressed which displaces the piston assembly (not shown) of the master cylinder 3. A definite volume of hydraulic fluid is, therefore, forced through the pipe 2 and into the chamber 10 via the inlet port 11 in the cylinder 9. The pressure of the fluid in the chamber 10 forces the movable cylinder 9 to the right as seen in FIG. 2. This in turn causes the thrust bearing 15 to move to the right and so pulls the clutch release levers 20 to the right via the coupling member 18 backed by the ring 17. Movement of the lever 20 causes the extension 5a, and therefore the clutch pressure plate 5 itself, to move to the right against the biassing force of the springs and so retracting the pressure plate and disengaging the drive. Each lever 20 is provided with a spring 22 which ensures contact between that lever and the coupling member 18.

On release of the pressure on the foot pedal 4, the cylinder 9, bearing 15 and clutch release levers 20 all return to their initial positions under the action of the pressure plate springs. At the same time hydraulic fluid is forced back via the pipe 2 to the master cylinder 3 and the clutch is re-engaged.

Owing to the construction of the hydraulic clutch release mechanism described above, wear of the clutch is automatically compensated by the change in the fluid volume of chamber 10. This results in a constant pedal travel irrespective of the wear condition of the clutch and the frictional material. Moreover, because of the simple nature of the seals 13a and 13b and of their small size, the pedal effort required to operate the clutch is considerably smaller than of known hydraulic units for heavy motor vehicles. Consequently, the feel of the clutch is an improvement on known clutches.

The above described clutch mechanism also has the advantage of increased sealing efficiency as compared with known arrangements. This is because the cylinder 9 which carries the thrust bearing 15 is well supported and isolated from such vibrations as are likely to affect sealing efficiency. As the inner cylinder 8 is rigidly attached to the clutch housing 1, any vibrations arising misalignment from between the axes of the hydraulic mechanism 6 and the transmission input shaft are prevented. The flexible spring steel member 18 which couples the outer ring 15b to the intermediate linkage 7 permits vibrations arising from any misalignment between the pressure plate 5 and the thrust bearing 15 to be accommodated elastically.

Other advantages of this clutch mechanism are that it is of reduced size and has fewer parts. This results in a unit which can be assembled easily on a production line basis at a reduced cost as compared with known designs. Also, the sealing efficiency of this clutch mechanism is better than that of known clutches so that a serious risk of corrosion, which could arise from the electrolytic action of clutch fluid between parts of different materials placed in close proximity is prevented.

What is claimed is:

1. A motor vehicle clutch release bearing and actuating mechanism comprising in combination a housing member, a clutch-disengaging device including a plurality of clutch release levers, a rolling-element thrust bearing and a hydraulically operated actuating device, said clutch-disengaging device being actuable, via said rolling-element thrust bearing, by said hydraulically operated actuating device, said hydraulically operated actuating device comprising a pair of coaxial stepped cylindrical members which define an annular chamber therebetween, the outer of said cylindrical members being slidable over the inner of said cylindrical members, said inner cylindrical member being fast to said housing member, wherein the inner ring of said rolling-element thrust bearing is fast to said outer cylindrical member and the outer ring of said rolling-element thrust bearing is flexibly coupled, by a coupling member, to said clutch release levers of said clutch-disengaging device so as to rotate therewith, said coupling member having the capability of flexing radially with respect to the axes of said rolling-element thrust bearing.

2. A motor vehicle clutch release bearing and actuating mechanism according to claim 1, wherein a spring steel plate constitutes said coupling member.

3. A motor vehicle clutch release bearing and actuating mechanism according to claim 1, wherein said inner cylindrical member comprises a first, inner tubular member fast to said housing member and a second, outer tubular member fast to said first tubular member said second tubular member being shorter than said first tubular member so as to define the step of said inner cylindrical member and said outer cylindrical member being slidable on said second tubular member.

4. A motor vehicle clutch release bearing and actuating mechanism according to claim 3, wherein said second tubular member is made of a material having a low coefficient of friction.

5. A motor vehicle clutch release bearing and actuating mechanism according to claim 3, wherein the stepped portion of said outer cylindrical member is slidably supported on said first tubular member by means of an L-shaped support ring made of a material having a low coefficient of friction.

6. A motor vehicle clutch release bearing and actuating mechanism according to claim 1, wherein a sealing member is provided at each end of said annular chamber.

7. A motor vehicle clutch release bearing and actuating mechanism according to claim 1, further comprising a supply of hydraulic fluid connected to said annular chamber via a passage in said outer cylindrical member.

* * * * *